July 7, 1942.   G. W. MARTIN   2,289,201
ENGINE
Filed June 7, 1941   4 Sheets-Sheet 1
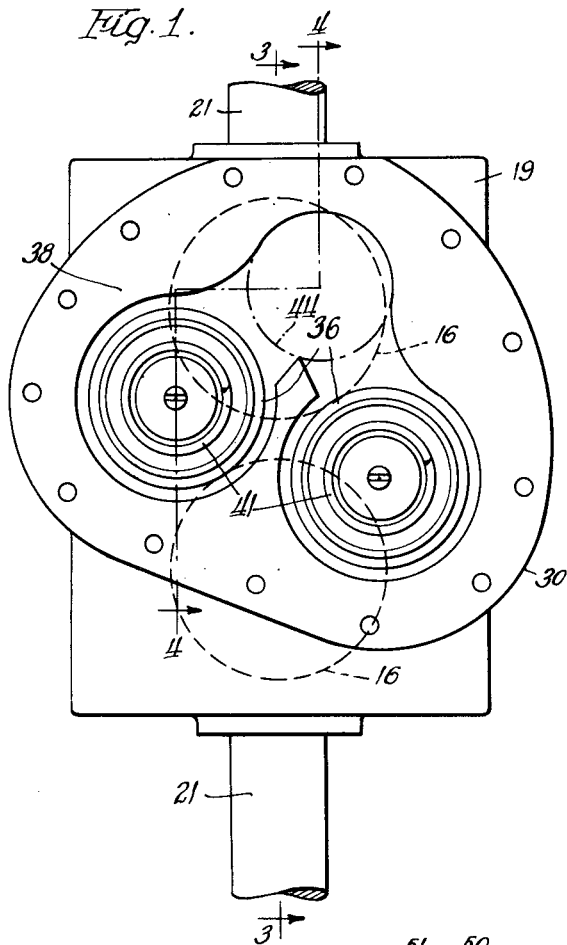
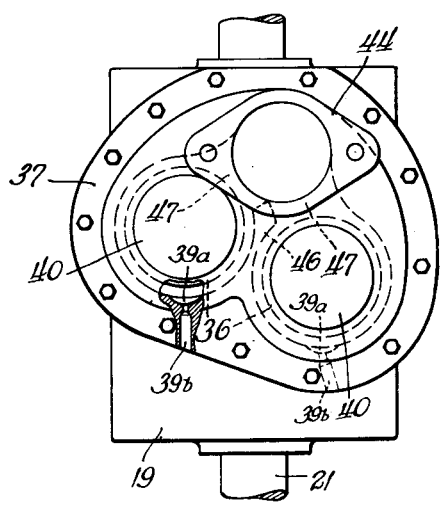
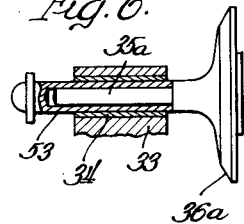
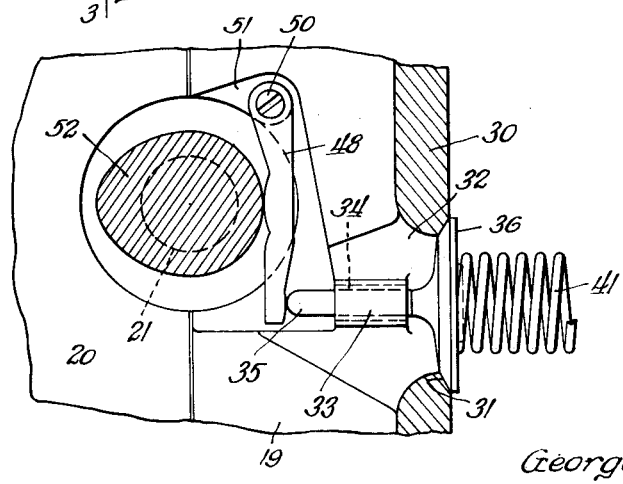
Inventor:
George W. Martin.
By Brown, Jackson, Boettcher & Dienner
Attys.

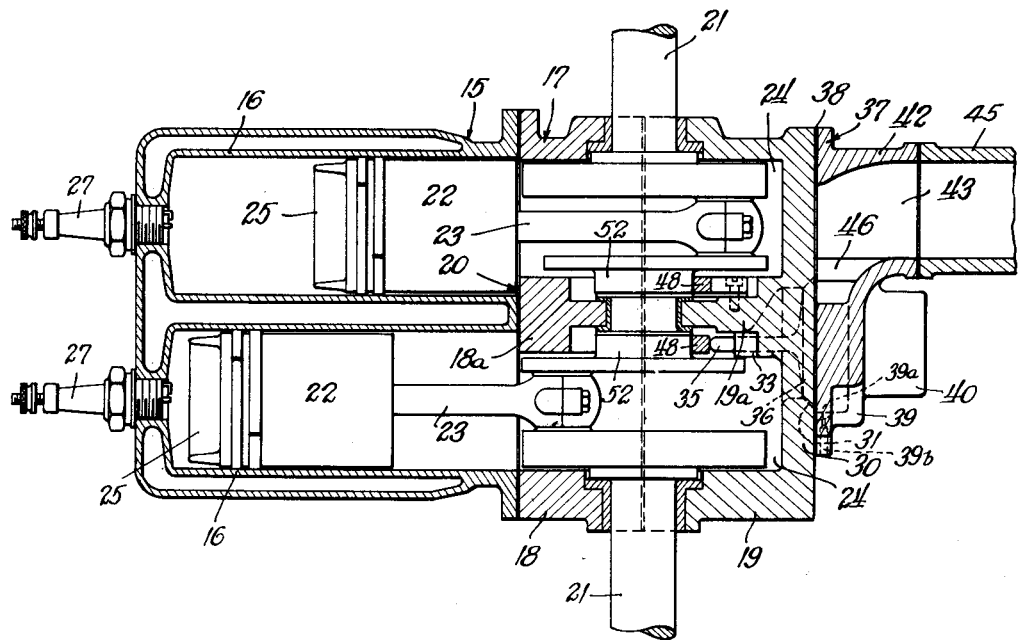
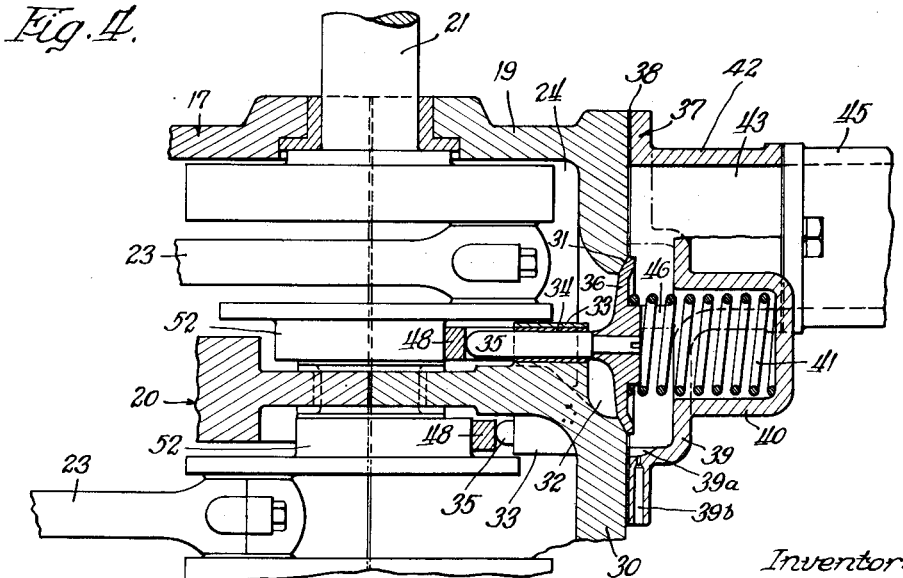

July 7, 1942.　　　G. W. MARTIN　　　2,289,201
ENGINE
Filed June 7, 1941　　　4 Sheets-Sheet 3

Inventor:
George W. Martin.
By Orwin, Jackson, Buttelu & Dunn
Attys.

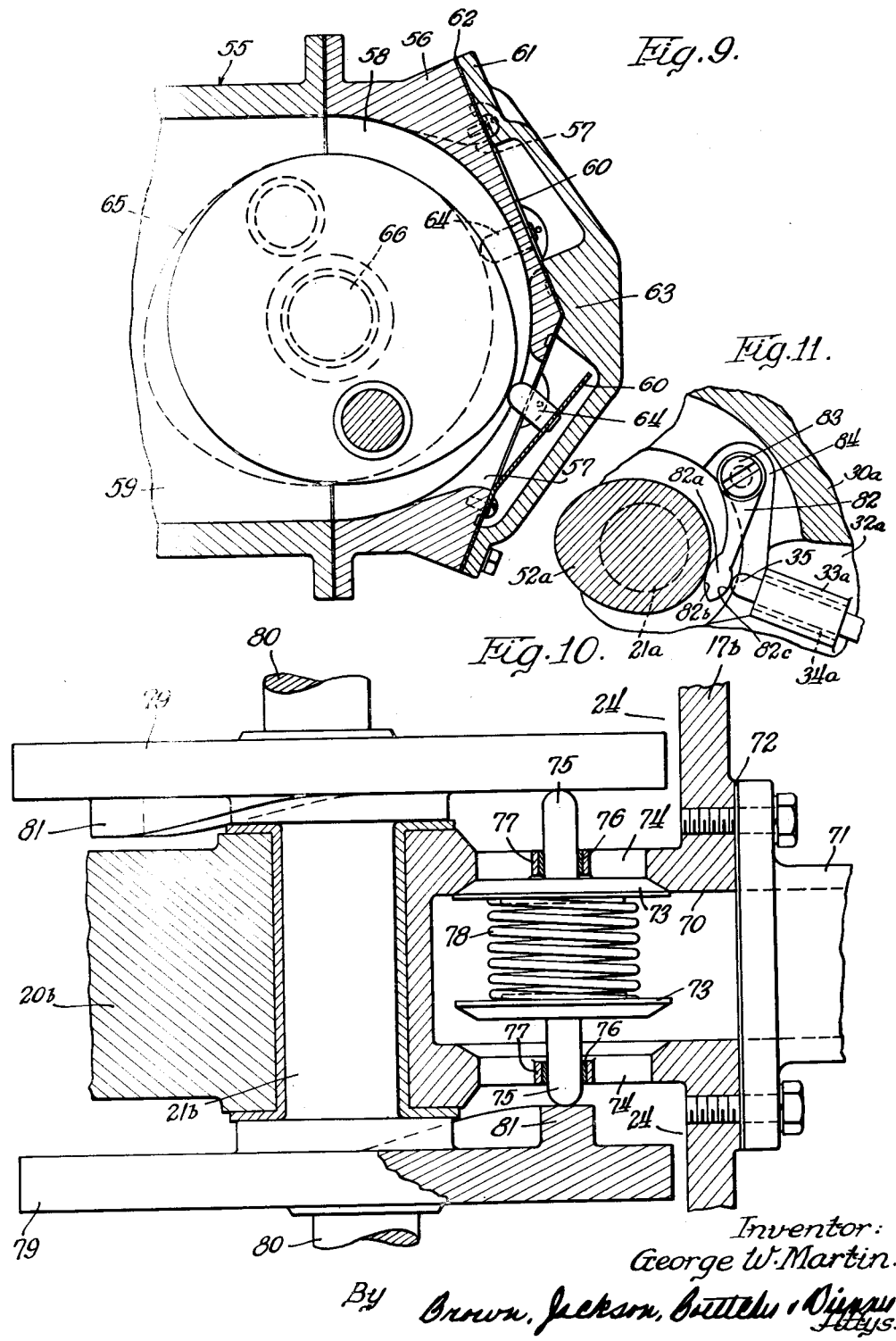

Patented July 7, 1942

2,289,201

UNITED STATES PATENT OFFICE 2,289,201

ENGINE

George W. Martin, South Bend, Ind.

Application June 7, 1941, Serial No. 396,993

19 Claims. (Cl. 123—73)

My invention relates to internal combustion engines of the two cycle type.

Engines of this type employing mechanically operated intake valves are known. Two cycle engines are generally adopted in order to provide a compact high speed power plant. Such engines are employed in outboard motors, for operating electric lighting generators, and for numerous other purposes.

In order to develop power of an engine of this character at high speed, the valves must be actuated so as to give the desired full opening and closing in exceedingly brief periods of time. The engine of my invention, which I shall hereafter describe in detail, is designed to operate at speeds as high as 5000 R. P. M. for continuous operation. I have conceived the necessity for reducing inertia of the parts which must reciprocate at these speeds to an absolute minimum. In general, I provide a valve mechanism operated at crank shaft speed, and I find that by disposing the axis of the valve substantially radially to the crank shaft, I can reduce the reciprocating parts to a minimum. In fact, the valve stem or valve button may be engaged directly with a cam on the crank shaft, or connected to the crank shaft, and operating at crank shaft speed. I may interpose a member to dissociate the rubbing tendency of the cam to thrust the valve laterally of its axis, and I conceive of such a member as merely a yielding wall of minimum inertia. Such a member may be shaped to maintain the bearing of the reciprocating valve member in a direction normal to the axis of the valve member. This same member may likewise have a bearing surface for engagement with a cam to maintain the direction of engagement between these parts substantially constant if so desired.

Another feature of my invention resides in the employment of an intake valve of the above or other character which opens outwardly, so that it may operate upon the incidence of excessive internal pressure, as would be the case of an explosion in the crank case, to relieve the pressure in the latter.

As above indicated, I prefer to reduce the weight of the valve itself to an absolute minimum and to reduce to a minimum any part interposed between the valve and the cam, and in fact, I may omit any interposed member, but where an interposed member is employed, I prefer to utilize such a member in which the direction of the force transmitted by the thrust of the cam is the same as the direction of movement of the valve without reversal. I have found that bell cranks and the like impose too much inertia, and have a tendency to retard the operation of the valve and produce a hammering and wear of the parts. In the swinging arm of my construction, the rubbing of the cam surface and the rubbing of the valve stem are substantially in parallel planes which are parallel to the longitudinal axis of the swinging member. The result is superior operation to a marked degree. In a bell crank, the entire force of operation is brought upon a pivot. That is not the case in the form of construction in which I use a swinging arm between the cam and the valve stem.

A further distinction of my preferred construction over devices of the prior art is that inasmuch as I project the stem of the valve in the direction of the axis of the crank shaft, that is, generally radially of the crank shaft, the stem itself forms the minimum conceivable connection between the valve itself and the cam on the crank shaft. Also, by the arrangement of my valve mechanism, no external opening through the crank case needs to be made, inasmuch as my valve opens outwardly in a generally radial direction, and hence the valve itself forms a closure for the parts which reach between the valve proper and the crank shaft or cam.

A further feature of novelty resides in the construction of the intake passageway and valve housing. This may be for a single valve or a plurality of valves, and the concept is to employ the same space for the spring housing which is employed for the intake passageway of the mixture. The intake passageway or manifold, as the case may be, further has a drain hole leading from the inside to atmosphere for draining any liquid such as excess fuel, which otherwise might be drawn into the motor and interfere with operation of the same. I believe that the employment of an open drain hole for draining excess fuel is new in the art of fuel feeding or carburetion. The volumetric capacity of the passageway between the valve and carburetor passage is relatively small, so that the pressure fluctuates very rapidly upon opening of the valve, and the amount of air which enters the drain hole may be compensated for in the setting of the carburetor. The result is an engine which in practice cannot be accidentally flooded by excess fuel.

Further objects and advantages of my invention will appear from the detail description.

In the drawings:

Figure 1 is a side view of an engine embodying my invention, as viewed from the crank case side thereof, with the gasket for the intake passage and spring housing member in position;

Figure 2 is a view similar to Figure 1, on a reduced scale, with the intake passage and spring housing member in position; the latter member being shown partly broken away and in section;

Figure 3 is a sectional view taken substantially on line 3—3 of Figure 1, on a reduced scale, with certain parts shown in elevation;

Figure 7:
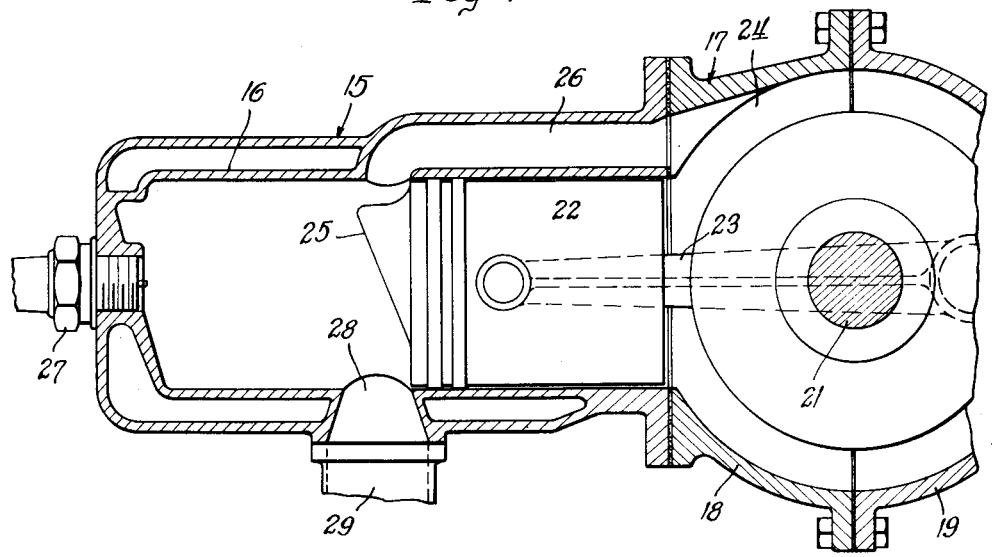

therefrom through port 57 inward of the crank case 55 and disposed for contact by a cam 65 carried by the crank shaft 66, cams 65 being disposed at the opposite ends of central bearing element 59, as are the buttons 64, as will be understood. Valves 60 are urged closed by their inherent resiliency and are positively opened in proper timed relation to the rotation of cam shaft 66 by the cams 65. The operation of the modified form of engine shown in Figure 9 is substantially the same as that of the engine shown in Figures 1 to 7, inclusive, and need not be described in greater detail.

Figure 10 illustrates a third modification in which central bearing element 20b of crank case 17b is provided with a recess 70 between its ends, this recess opening at its outer side through the crank case at the opposite side thereof from the cylinder. A carburetor stack 71 opens into the outer side of recess 70 and is bolted to crank case 17b, with an intervening gasket 72. Recess 70 provides a chamber for two valves 73 controlling ports 74 opening through the ends of central bearing member 20b into the respective compartments 24 of the crank case. Each valve 73 is provided with a stem 75 slidable through a bushing 76 mounted in a suitably apertured lug 77 extending into port 74 from bearing element 20b. A coil compression spring 78 is confined between the valves 73 and yieldingly urges the latter closed, recess 70 providing a chamber for housing the valves and the associated compression spring. Crank shaft 21b is provided with crank disks 79 at opposite ends of and adjacent central bearing element 20b, these disks bearing the crank pins 80. Each disk 79 is provided, at the side thereof adjacent central bearing element 20b, with a cam 81 disposed to contact stem 75 of the corresponding valve 73. Cams 81 are so disposed as to assure proper timing of the valves 73, with respect to opening and closing thereof and the period of time during which they are held open, relative to the rotation of the crank shaft. The operation of the engine of Figure 10 is similar to that of the engine of Figures 1 to 7, inclusive, and need not be described in greater detail.

Figure 8:
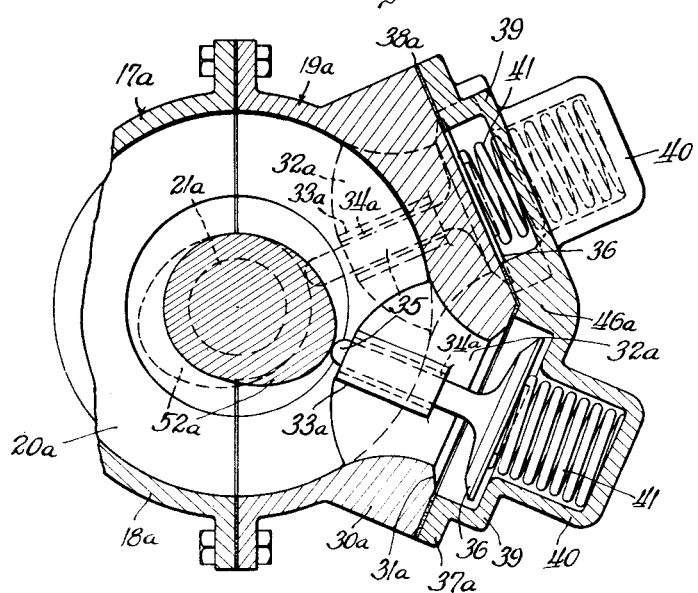

Figure 11 shows, fragmentarily, a variation of the engine of Figure 8. A cam follower 82 is pivoted at one end, by a screw 83, in a recess 84 formed in one end of the central bearing element 20a of the crank case. The other end 82a of the cam follower 82 is of generally elliptical shape, providing an inwardly extending arcuate inner surface 82b and an outwardly extending arcuate outer surface 82c. Surface 82b contacts cam 52a and takes the rubbing thereof, eliminating any tendency to cause side thrust and binding of the valve stem in its guide such as might occur, under unfavorable conditions, where the inner end of the valve stem directly contacts the cam. The outer surface 82c of the follower 82 contacts the inner end of valve stem 35, or of the cap 53 therefor, as the case may be, for opening valve 36 in timed relation to the rotation of the crank shaft as before. The surfaces 82b and 82c of follower 82 are so related to cam 52a and valve stem 35 that the outward thrust transmitted to the latter is at all times along the axis thereof, that is, normal to the valve head or valve member proper. That eliminates any tendency to side thrust and binding of the valve stem. Cam follower 82 swings freely about its pivot, which is subjected to no appreciable thrust transversely, and may be regarded as a yielding wall of minimum inertia interposed between the cam and the valve stem and well suited for operation of the engine at high speed.

In all of the forms of my engine shown by way of example, I preferably provide the intake and spring housing member or the intake passage member, as the case may be, with a drainage passage or duct 39b associated with the valve pocket to prevent flooding, as previously described. My invention is applicable to either single cylinder engines or multiple cylinder engines, as previously noted and as will be readily understood, and is also applicable to opposed piston engines of known type, having in each cylinder two pistons operating in opposite directions and defining between them, with the cylinder, the combustion space of the engine. Also, while in Figures 1 to 9, inclusive, I have shown the intake valves as off-set or staggered transversely, of the crank shaft, that is not essential to the broader concept of my invention. In engines in which the central or interior bearing element is of sufficient length to provide sufficient clearance between adjacent valves, the intake valves may be arranged in a line along the crank shaft. If the interior or central bearing element is of insufficient length to accommodate in line arrangement of the valves, they may be disposed in offset or staggered arrangement, as illustrated, or they may be so disposed in any case where necessary or desired.

For single cylinder engines the central or interior bearing element for the crank shaft may be replaced by a suitable member for supporting the valve stem guide and, if used, the cam follower. That variation will be obvious and requires no illustration or detailed description. In the case of multiple cylinder engines having an even number of cylinders, the cylinders conveniently are arranged in pairs and the crank case is divided interiorly into compartments, one for each cylinder, by interior bearing elements between the pairs of cylinders, as above. An engine having an odd number of cylinders may be considered as an engine having an even number of cylinders and a single cylinder engine and treated accordingly, as will be obvious.

As above indicated, and as will be understood by those skilled in the art, changes in construction and arrangement of parts of my invention may be resorted to without departing from the field and scope thereof, and I intend to include in this application, in which the preferred forms only of my invention have been disclosed, all such variations as fall within the scope of the appended claims.

I claim:

1. In a two cycle internal combustion engine, a crank case having a central bearing element and defining two separate compartments, a pair of cylinders respectively opening at one end into said compartments, a crank shaft rotatably mounted in said crank case, a piston operating in the respective cylinders having operating connection to said shaft, said compartments each having a fuel mixture intake port and a transfer passage and being otherwise closed, outwardly opening valves controlling said ports yieldingly urged closed and urged outwardly in opening direction by pressure within the respective compartments, and means within the respective compartments comprising cams on said crank shaft for opening said valves in predetermined timed relation to rotation of said shaft.

2. In a two cycle internal combustion engine, a crank case defining a compartment, a cylinder opening at one end into said compartment, a crank shaft rotatably mounted in said crank case, a piston operating in said cylinder having operating connection to said shaft, said compartment having a fuel mixture intake port and a transfer passage and being otherwise closed, an intake valve controlling said port yieldingly urged closed and disposed with its axis substantially radial to said shaft, said valve being urged in opening direction by pressure within said compartments, and means within said compartment comprising a cam on said shaft for opening said valve in predetermined timed relation to rotation of said shaft.

3. In a two cycle internal combustion engine, a crank case having a central bearing element and defining two separate compartments, a pair of cylinders respectively opening at one end into said compartments, a crank shaft rotatably mounted in said crank case, a piston operating in the respective cylinders having operating connection to said shaft, said compartments each having an intake port and a transfer passage and being otherwise closed, outwardly opening valves controlling said ports yieldingly urged closed and disposed with their axes at opposite ends of said bearing element substantially radial to said shaft, said valves being urged outwardly in opening direction by pressure within the respective compartments, and means comprising cams on said shaft adjacent the ends of said bearing element for opening said valves in predetermined timed relation to rotation of said shaft.

4. In a two cycle internal combustion engine, a crank case having a central bearing element and defining two separate compartments, said crank case having at one side a wall defining two exterior outwardly converging surfaces, a pair of cylinders at the other side of said crank case respectively opening at one end into said compartments, a crank shaft rotatably mounted in said crank case, a piston operating in the respective cylinders having operating connection to said shaft, said compartments each having an intake port opening through one of said surfaces and a transfer passage and being otherwise closed, outwardly opening valves controlling said ports yieldingly urged closed and disposed with their axes at opposite ends of said bearing element substantially radial to said shaft, and means comprising cams on said shaft adjacent the ends of said bearing element for opening said valves in predetermined timed relation to rotation of said shaft.

5. In a two cycle internal combustion engine, a crank case having a central bearing element and defining two separate compartments, said crank case having at one side a wall defining two exterior outwardly converging surfaces, a pair of cylinders at the other side of said crank case respectively opening at one end into said compartments, a crank shaft rotatably mounted in said crank case, a piston operating in the respective cylinders having operating connection to said shaft, said compartments each having an intake port opening through one of said surfaces and a transfer passage and being otherwise closed, outwardly opening valves controlling said ports yieldingly urged closed, and means comprising cams on said shaft adjacent the ends of said bearing element for opening said valves in predetermined timed relation to rotation of said shaft.

6. In a two cycle internal combustion engine, a crank case having a central bearing element and defining two separate compartments, a pair of cylinders at one side of said crank case respectively opening at one end into said compartments, a crank shaft rotatably mounted in said crank case, a piston operating in the respective cylinders having operating connection to said shaft, said compartments each having a transfer passage, said crank case having intake ports at the opposite side thereof opening directly into the respective compartments, the latter being otherwise closed, outwardly opening valves controlling said ports yieldingly urged closed, and means comprising cams on said shaft adjacent the ends of said bearing element for opening said valves in predetermined timed relation to rotation of said crank shaft.

7. In a two cycle internal combustion engine, a crank case having a central bearing element and defining two separate compartments, a pair of cylinders respectively opening at one end into said compartments, a crank shaft rotatably mounted in said crank case, a piston operating in the respective cylinders having operating connection to said shaft, each of said compartments having a transfer passage and said central bearing member being provided with a recess between the ends thereof defining a valve chamber and having intake ports opening from said chamber into the respective compartments, the latter being otherwise closed, outwardly opening valves controlling said ports yieldingly urged closed, and means comprising cams on said shaft adjacent the ends of said central element for opening said valves in predetermined timed relation to rotation of said shaft.

8. In a two cycle internal combustion engine, a crank case having a central bearing element and defining two separate compartments, a pair of cylinders respectively opening at one end into said compartments, a crank shaft rotatably mounted in said crank case, a piston operating in the respective cylinders having operating connection to said shaft, each of said compartments having a transfer passage and said central bearing member being provided with a recess between the ends thereof defining a valve chamber and having intake ports opening from said chamber into the respective compartments, the latter being otherwise closed, coaxial outwardly opening valves controlling said ports, the axis of said valves being substantially parallel with the axis of said shaft, a compression spring confined between said valves urging them closed and means comprising cams on said shaft adjacent the ends of said central element for opening said valves in predetermined timed relation to rotation of said shaft.

9. In a two cycle internal combustion engine, a crank case having a central bearing element and defining two separate compartments, a pair of cylinders at one side of said crank case respectively opening at one end into said compartments, a crank shaft rotatably mounted in said crank case, a piston operating in the respective cylinders having operating connection to said shaft, said compartments each having a transfer passage, said crank case having intake ports at the opposite side thereof opening directly into the respective compartments, the latter being otherwise closed, outwardly opening valves controlling said ports yieldingly urged closed, means comprising cams on said shaft adjacent the ends of said bearing element for opening said valves in predetermined timed relation to rotation of said crank shaft, and an intake passage member secured to said crank case having pockets for receiving said valves in the open position thereof, said member being provided with an inlet opening and with passages leading therefrom to said pockets.

10. In an internal combustion engine utilizing crank case compression for charging the combustion space, a crank case formed with a fuel mixture intake port, a crank shaft within the crank case, an intake valve yieldingly urged closed controlling said port and urged in opening direction by pressure within said crank case, and means actuated by said crank shaft operating through said port for opening said valve in predetermined timed relation to rotation of said shaft.

11. In an internal combustion engine utilizing crank case compression for charging the combustion space, a crank case having an intake port for admitting thereto combustion supporting fluid, a crank shaft within the crank case, and an outwardly opening timed mechanically operated valve controlling said intake port and urged outwardly in opening direction by pressure within said crank case.

12. In an internal combustion engine utilizing crank case compression for charging the combustion space, a crank case containing a crank shaft and formed with an intake port, a valve controlling said port disposed to seat thereabout and urged closed by yielding pressure, said valve having a stem extending inwardly through said port into the crank case and terminating adjacent the crank shaft, said valve being urged in opening direction by pressure within said crank case and the yielding pressure urging said valve closed being effective normally for holding it closed while permitting opening of said valve responsive to excessive pressure within said crank case, and means within said crank case adapted to engage said stem and open said valve in timed relation to rotation of said shaft, said means comprising a cam on said crank shaft.

13. In an internal combustion engine utilizing crank case compression for charging the combustion space, a crank case containing a crank shaft and formed with an intake port, an outwardly opening and inwardly closing valve controlling said port disposed to seat thereabout and having a stem extending inwardly through said port into the crank case and terminating adjacent the crank shaft, spring means urging said valve inwardly normally holding it closed while permitting opening thereof responsive to excessive pressure within said crank case, and means within said crank case adapted to engage said valve stem and open said valve in timed relation to rotation of said shaft.

14. In an internal combustion engine utilizing crank case compression for charging the combustion space, a crank case formed with an intake port, a crank shaft within the crank case, an outwardly opening and inwardly closing valve controlling said port having a stem extending inwardly through said port into the crank case, means within the crank case cooperating with said stem for opening the valve in timed relation to rotation of said shaft, said means comprising a cam on said crank shaft, an intake passage member secured to the external surface of the crank case surrounding the intake port and formed with a recess opposite the intake port, and a spring seated in said recess and engaging said valve normally holding it closed while permitting opening thereof by excessive pressure within said crank case.

15. In an internal combustion engine utilizing crank case compression for charging the combustion space, a crank case formed with an intake port, a mechanically operated and timed intake valve controlling said port urged in opening direction by pressure within said crankcase, an intake passage member secured to the external surface of the crank case surrounding the intake port and formed with a recess opposite the intake port, and a valve spring seated in said recess and engaging said valve normally holding it closed while permitting opening of said valve by excessive pressure within said crank case.

16. In an internal combustion engine utilizing crank case compression for charging the combustion space, a crank case having an intake port, a valve controlling said port yieldingly urged closed, and an intake passage member secured to said crank case having a valve pocket overlying said valve and provided with a fuel drainage duct leading from the lower portion of said pocket.

17. In an internal combustion engine utilizing crank case compression for charging the combustion space, a crank case having an intake port, a valve controlling said port, an intake passage and spring housing member secured to said crank case having a valve pocket and a spring housing overlying said valve, said member being provided with a fuel drainage duct leading from the lower portion of said pocket to atmosphere, and a spring confined between said valve and the outer end of said housing yieldingly holding said valve closed.

18. In an internal combustion engine, a crank case defining a compartment, a cylinder opening at one end into said compartment, a crank shaft rotatably mounted in said crank case, a piston operating in said cylinder having operating connection to said shaft, said compartment having an intake port for admitting thereto combustion supporting fluid and a transfer passage and being otherwise closed, an intake valve controlling said port opening outwardly of said compartment and yieldingly urged closed inwardly of said compartment in opposition to pressure within the latter, and means actuated by said crank shaft for opening said valve in predetermined timed relation to rotation of said shaft.

19. In an internal combustion engine, a case defining a crank shaft compartment, a cylinder opening at one end into said compartment, a crank shaft rotatably mounted in said case, a piston operating in said cylinder having operating connection to said shaft, said compartment having an intake port for admitting thereto combustion supporting fluid and a transfer passage and being otherwise closed, an intake valve controlling said port opening outwardly of said compartment and yieldingly urged closed inwardly of said compartment in opposition to pressure within the latter, and means actuated by said crank shaft for opening said valve in predetermined timed relation to rotation of said shaft.

GEORGE W. MARTIN.

Aug. 4, 1942.    F. D. JONAS    2,291,724
FILING FOLDER
Filed Nov. 10, 1939    4 Sheets-Sheet 1
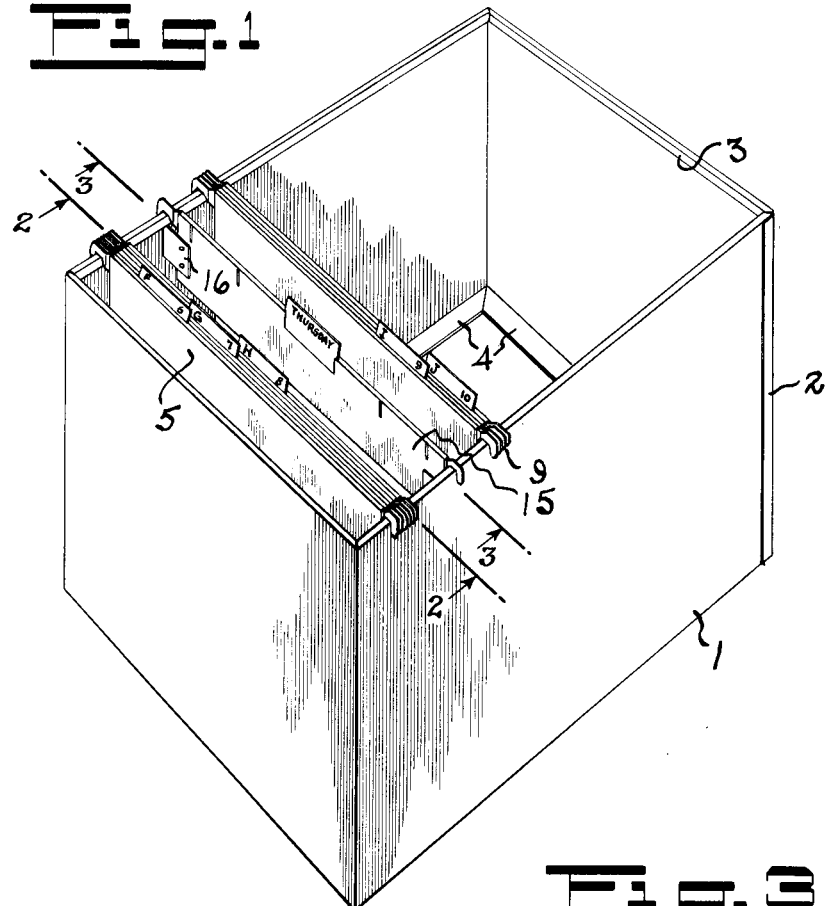
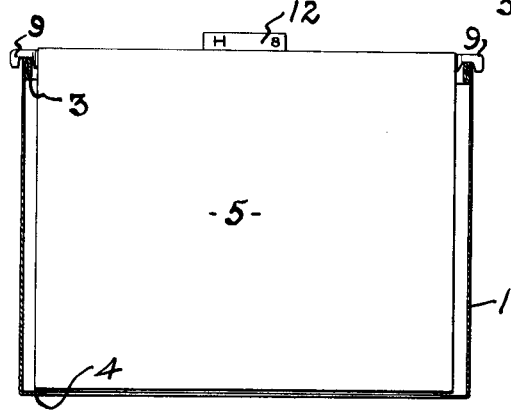
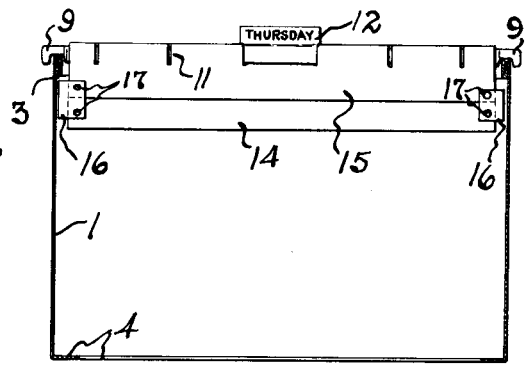
INVENTOR.
Frank D. Jonas
BY Darby & Darby
ATTORNEYS